United States Patent
Kang et al.

(10) Patent No.: US 9,959,862 B2
(45) Date of Patent: May 1, 2018

(54) APPARATUS AND METHOD FOR RECOGNIZING SPEECH BASED ON A DEEP-NEURAL-NETWORK (DNN) SOUND MODEL

(71) Applicant: ELECTRONICS AND TELECOMMUNICATIONS RESEARCH INSTITUTE, Daejeon (KR)

(72) Inventors: Byung Ok Kang, Daejeon (KR); Jeon Gue Park, Daejeon (KR); Hwa Jeon Song, Daejeon (KR); Yun Keun Lee, Daejeon (KR); Eui Sok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 9 days.

(21) Appl. No.: 15/187,581

(22) Filed: Jun. 20, 2016

(65) Prior Publication Data

US 2017/0206894 A1    Jul. 20, 2017

(30) Foreign Application Priority Data

Jan. 18, 2016  (KR) .................. 10-2016-0005755

(51) Int. Cl.
*G10L 15/16* (2006.01)
*G10L 15/07* (2013.01)
*G10L 15/02* (2006.01)
*G10L 15/06* (2013.01)

(52) U.S. Cl.
CPC ............ *G10L 15/16* (2013.01); *G10L 15/063* (2013.01); *G10L 15/07* (2013.01); *G10L 2015/022* (2013.01); *G10L 2015/0636* (2013.01)

(58) Field of Classification Search
CPC ................. G10L 2015/0636; G10L 2015/022
See application file for complete search history.

(56) References Cited

U.S. PATENT DOCUMENTS

| | | | |
|---|---|---|---|
| 6,185,528 B1 | 2/2001 | Fissore et al. | |
| 6,212,500 B1 | 4/2001 | Köhler | |
| 9,460,711 B1 * | 10/2016 | Vanhoucke | G10L 15/16 |
| 2009/0119105 A1 * | 5/2009 | Kim | G10L 15/07 |
| | | | 704/244 |
| 2011/0288869 A1 * | 11/2011 | Menendez-Pidal | G10L 15/144 |
| | | | 704/256.1 |
| 2012/0109650 A1 | 5/2012 | Cho et al. | |
| 2014/0172428 A1 | 6/2014 | Han | |
| 2014/0372112 A1 | 12/2014 | Xue et al. | |
| 2015/0161994 A1 * | 6/2015 | Tang | G10L 15/02 |
| | | | 704/232 |

FOREIGN PATENT DOCUMENTS

JP    2000-029495 A    1/2000

\* cited by examiner

*Primary Examiner* — Qian Yang

(57) ABSTRACT

A speech recognition apparatus based on a deep-neural-network (DNN) sound model includes a memory and a processor. As the processor executes a program stored in the memory, the processor generates sound-model state sets corresponding to a plurality of pieces of set training speech data included in multi-set training speech data, generates a multi-set state cluster from the sound-model state sets, and sets the multi-set training speech data as an input node and the multi-set state cluster as output nodes so as to learn a DNN structured parameter.

16 Claims, 4 Drawing Sheets

APPARATUS AND METHOD FOR RECOGNIZING SPEECH BASED ON A DEEP-NEURAL-NETWORK (DNN) SOUND MODEL

CROSS-REFERENCE TO RELATED APPLICATION

This application claims priority to and the benefit of Korean Patent Application No. 10-2006-0005755, filed on Jan. 18, 2016, the disclosure of which is incorporated herein by reference in its entirety.

BACKGROUND

1. Field of the Invention

The present invention relates to an apparatus and method for recognizing speech, and more particularly, to a speech recognition apparatus and method based on a deep-neural-network (DNN) sound model.

2. Discussion of Related Art

A context-dependent deep-neural-network (DNN)-hidden-Markov-Model (HMM) technique using a combination of a DNN and an HMM has been actively applied to sound models for speech recognition by replacing an existing CD-Gaussian-mixture-model-HMM (CD-GMM-HMM) (hereinafter referred to as 'GMM-HMM') technique.

A DNN-HMM technique according to the related art is performed as will be described below.

First, a state of an HMM corresponding to an output node or a target of a DNN structure is determined through a process of learning an HMM, and state-level alignment information of training speech data is extracted.

A process of learning a DNN may be a process of receiving information regarding the state of the HMM determined on the basis of a result of learning the HMM and the state-level alignment information of the training speech data, and obtaining characteristics of a shape which is most distinctive in terms of pattern recognition and model parameters.

In this case, the state-level alignment information may be obtained through a method capable of iterative learning after state-level realignment by including this information in the process of learning a DNN. However, in a DNN learning technique according to the related art, state-level alignment information is determined beforehand and thus an output node of a DNN structure cannot be changed.

Meanwhile, a state of an HMM for recognizing large-vocabulary speech is generally determined according to a decision tree-based method. However, it is inefficient to determine a state of large-size training speech data having different acoustic-statistical characteristics (e.g., a sound model for recognizing English speech of multiple native speakers who can speak, for example, Chinese, Korean, and English) using one decision tree.

A DNN-HMM structured sound model employing DNN structure-based machine learning has a very high discrimination performance and thus has recently been used in the field of pattern recognition including speech recognition by replacing an existing GMM-HMM-based sound model.

However, a DNN-HMM-based learning technique according to the related art is a method of learning a structure having characteristics and parameters that most appropriately discriminate predetermined states and thus is not applicable in the field of speech recognition application performed with respect to multiple native speakers having different acoustic-statistical characteristics.

In this regard, Korean laid-open patent publication No. 10-2006-0133610 entitled "Heart Sound Classification Method Using Hidden-Markov-Model" discloses a heart sound classification method of modeling an HMM using heart sound data and recognizing the modeled HMM.

SUMMARY OF THE INVENTION

Exemplary embodiments of the present invention are directed to a method of determining a multi-set state cluster for learning a sound model with respect to multi-set training speech data having different acoustic-statistical characteristics; a method of performing training by setting a state set cluster corresponding to training speech data for specific set while having a common deep-neural-network (DNN) structured parameter including different multi-set acoustic-statistical characteristics and a DNN-hidden-Markov-model (HMM) structure including a multi-set state cluster; and a method of performing speech recognition by setting a sound-model state set corresponding to characteristic information of a user's speech which is received together with the user's speech as an output node.

Aspects of the present invention are not, however, limited to the above embodiments, and additional aspects may be achieved.

According to an aspect of the present invention, a speech recognition apparatus based on a DNN sound model includes a memory, and a processor configured to execute a program stored in the memory. As the program is executed, the process generates sound-model state sets corresponding to a plurality of pieces of set training speech data included in multi-set training speech data, generates a multi-set state cluster from the sound-model state sets, and sets the multi-set training speech data as an input node and the multi-set state cluster as an output node so as to learn a DNN structured parameter. When a user's speech and characteristic information thereof are received via a user interface, the processor recognizes the user's speech on the basis of the learned DNN structured parameter by setting a sound-model state set corresponding to the characteristic information of the user's speech as an output node.

According to another aspect of the present invention, a speech recognition method based on a DNN sound model includes generating sound-model state sets corresponding to a plurality of pieces of set training speech data included in multi-set training speech data, generating a multi-set state cluster from the sound-model state sets, learning a DNN structured parameter by setting the multi-set training speech data as an input node and the multi-set state cluster as an output node, receiving a user's speech and characteristic information thereof via a user interface; and recognizing the user's speech on the basis of the learned DNN structured parameter by setting a sound-model state set corresponding to the characteristic information of the user's speech as an output node.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Exemplary embodiments of the present invention will be described in detail below with reference to the accompanying drawings so that those skilled in the art can easily accomplish them. This invention may, however, be embodied in many different forms and is not to be construed as being limited to the embodiments set forth herein. In the following description, well-known functions or constructions are not described in detail if it is determined that they would obscure the invention due to unnecessary detail.

It should be understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof unless stated otherwise.

Figure 1:
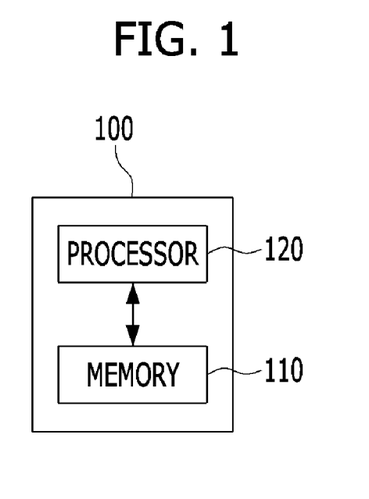
FIG. 1 is a block diagram of a speech recognition apparatus according to an exemplary embodiment of the present invention.

FIG. 1 is a block diagram of a speech recognition apparatus 100 according to an exemplary embodiment of the present invention.

According to an exemplary embodiment of the present invention, the speech recognition apparatus 100 based on a deep-neural-network (DNN) sound model includes a memory 110 and a processor 120.

The memory 110 stores a program which generates a multi-set cluster and learns a DNN structured parameter for recognizing a user's speech. Here, the memory 110 collectively refers to a non-volatile storage device capable of retaining information stored therein even if power is not supplied thereto and a volatile storage device.

Examples of the memory 110 may include a NAND flash memory such as a compact flash (CF) card, a secure digital (SD) card, a memory stick, a solid-state drive (SSD), a micro-SD card, and so on, a magnetic computer storage device such as a hard disk drive (HDD), and so on, an optical disc drive such as a compact disc (CD)-read only memory (ROM) and a digital versatile disc (DVD)-ROM, and so on.

The processor 120 executes the program stored in the memory 110.

As the program is executed, the processor 120 performs generating a multi-set state cluster, learning a DNN structured parameter, and recognizing a user's speech received via a user interface on the basis of the learned DNN structured parameter, as will be described in detail with reference to FIGS. 2A to 2C below.

The components of the speech recognition apparatus 100 illustrated in FIG. 1 according to an exemplary embodiment of the present invention may be embodied by software or hardware such as a field programmable gate array (FPGA) or an application specific integrated circuit (ASIC), and may perform predetermined functions.

However, these components are not limited to software or hardware, and may be configured to be included in an addressable storage medium, and may be configured to be executed by one or more processors.

Thus, examples of the components include components such as software components, object-oriented software components, class components, and task components, processes, functions, attributes, procedures, subroutines, segments of program code, drivers, firmware, microcode, circuits, data, databases, data structures, tables, arrays, and variables.

The components and functions thereof may be merged into a smaller number of components or may be divided into subcomponents.

Figure 2A:
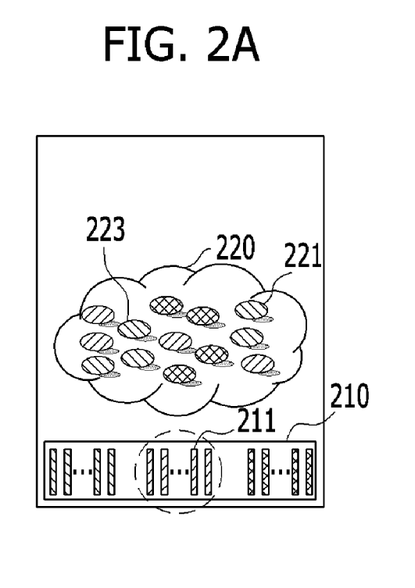
FIGS. 2A to 2C are diagrams illustrating a process of recognizing a user's speech by generating a multi-set state cluster and learning a deep-neural-network (DNN) structured parameter, according to an exemplary embodiment of the present invention.
Figure 2B:
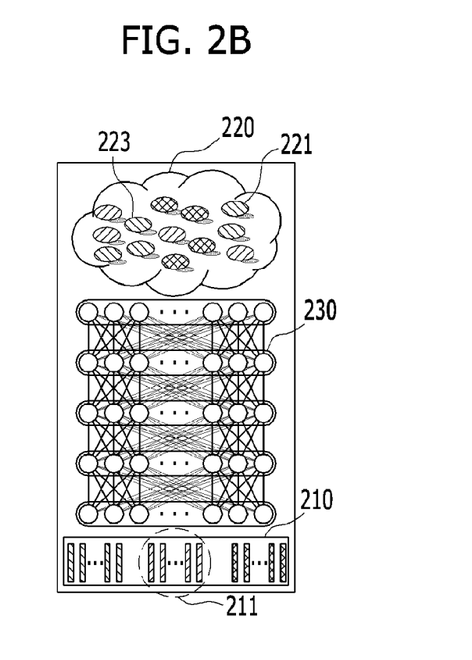
Figure 2C:
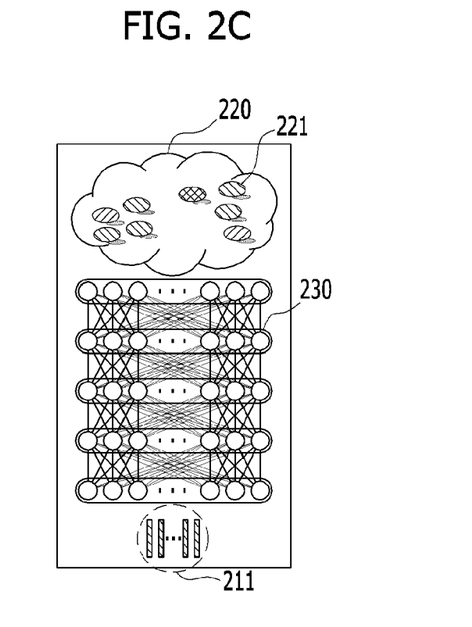

FIGS. 2A to 2C are diagrams illustrating a process of recognizing a user's speech by generating a multi-set state cluster and learning a DNN structured parameter.

First, referring to FIG. 2A, the processor 120 of FIG. 1 generates sound-model state sets 221 and 223 corresponding to a plurality of pieces of set training speech data 211 included in multi-set training speech data 210. Then the processor 120 generates a multi-set state cluster 220 from the sound-model state sets 221 and 223.

The multi-set training speech data 210 is speech data used to train a sound model. In this case, the multi-set training speech data 210 includes the plurality of pieces of set training speech data 211 having different acoustic-statistical characteristics.

The different acoustic-statistical characteristics of the plurality of pieces of set training speech data 211 may be, for example, sound-model training data for speech recognition under both a quiet environment and an extremely noisy environment.

As another example, the different acoustic-statistical characteristics may be those corresponding to speakers of different native languages. That is, when the number of the plurality of pieces of set training speech data 211 is three, the different acoustic-statistical characteristics may be data for training an integrated English sound model of sets of English, Korean, and Chinese native speakers having three different acoustic-statistical characteristics.

For example, the processor 120 generates an English sound-model state set of Korean native speakers from an English speech data set for training Korean native speakers. Similarly, the processor 120 generates an English sound-model state set of Chinese and English native speakers from English speech data sets for training them in the same manner described above.

In this case, the sound-model state sets 221 and 223 are GMM-HMMs and thus may include different decision trees and different state sets.

When the sound-model state sets 221 and 223 corresponding to the plurality of pieces of set training speech data 211 are generated through the above process, the processor 120 generates multi-state sets by collecting the sound-model state sets 221 and 223.

Then the processor 120 generates the multi-set state cluster 220 by clustering the multi-state sets. In this case, the processor 120 may generate the multi-state set cluster 220 by merging states occupying similar acoustic spaces among individual states belonging to the sound-model state sets 221 and 223 included in the multi-state sets.

In detail, the processor 120 calculates state log likelihoods of each state of the sound-model state sets 221 and 223. Then the processor 120 may generate the multi-set state cluster 220 by merging similar state clusters on the basis of the state log likelihoods and state tying information of the sound-model state sets 221 and 223.

First, the processor 120 may calculate the state log likelihoods using Equation 1 below.

$$L(s) = \sum_{f \in F} \log(P(x_f; \mu_s, \Sigma_s))\gamma_s(x_f) \quad \text{[Equation 1]}$$

In Equation 1, L(s) denotes a state log likelihood of a corresponding state, F denotes the number of frames of each state s, $\gamma_s(x_f)$ denotes a posterior observation probability of an observation speech data vector $x_f$ of each state s, and $P(x_f;\mu_s,\Sigma_s)$ denotes a state observation probability.

In the case of a Gaussian distribution, Equation 1 above may be converted into Equation 2 below. Actually, Equation 2 below is used to calculate a state log likelihood.

$$L(s) = -\frac{1}{2}(\log[(2\pi)^n|\Sigma_s|] + n)\sum_{f \in F}\gamma_s(x_f) \quad \text{[Equation 2]}$$

In Equation 2, n denotes a dimension of the observation speech data vector $x_f$.

After the state log likelihoods are calculated, the processor 120 merges similar state clusters occupying similar acoustic spaces on the basis of the state log likelihoods and the state tying information of each of the sound-model state sets 221 and 223.

The similar state clusters may be merged according to a method which will be described below.

First, the processor 120 may calculate a state log likelihood $L(state_{merged})$ corresponding to a result of merging states of two random sound-model state sets included in the multi-state sets. The two random sound-model state sets may be merged when a difference $\Delta L_{merged}$ between a sum $L(state_1)+L(state_2)$ of the state log likelihoods of the two random sound-model state sets and the state log likelihood $L(state_{merged})$ corresponding to the result of merging the states of the two random sound-model state sets is equal to or less than a predetermined threshold.

Such a merging criterion may be given by Equation 3 below.

$\Delta L_{merged}=L(state_1)+L(state_2)-L(state_{merged})$ $\Delta L_{merged} \leq \text{Threshold}$ [Equation 3]

As shown in Equation 3, when the difference $\Delta L_{merged}$ of the state log likelihoods when the two states are merged is equal to or less than the predetermined threshold, the two states may be considered as occupying similar acoustic spaces in terms of observation data and thus may be merged.

In contrast, when logical tri-phone sets corresponding to the two random sound-model state sets included in the multi-state sets are the same, the processor 120 may merge the two random sound-model state sets.

Such a merging criterion may be given by Equation 4 below.

$\{T_{sub1}|T_{sub1}$ is the logical tri-phone sharing $state_1\}$ $=\{T_{sub2}|T_{sub2}$ is the logical tri-phone sharing $state_2\}$ [Equation 4]

As shown in Equation 4, when logical tri-phone sets sharing two random states $state_1$ and $state_2$ selected from the multi-state sets are the same, the two random states $state_1$ and $state_2$ may be considered as occupying similar acoustic spaces and thus may be merged.

In this case, the processor 120 according to an exemplary embodiment of the present invention may merge the two random sound-model state sets when the logical tri-phone sets of the two random sound-model state sets included in the multi-state sets are mutually inclusive and no logical tri-phone set has a relation including another sound-model state set.

That is, even if the logical tri-phone sets of the two random sound-model state sets are exactly the same, the two random sound-model state sets may be merged when one of the two random sound-model state sets includes the other and no logical tri-phone set shares the state of the other.

By merging similar state clusters as described above, an independent state space of the sound-model state set 223 is principally configured on the multi-set state cluster 220 and a result of merging sound-model state sets may be configured to share a state space of the sound-model state set 221.

For example, an English sound-model state set of a Korean native speaker may form a single state space, and may share a state space of an English sound model of a speaker of a different native language when it is merged with another English sound-model state set.

As described above, the multi-set state cluster 220 generated by merging similar state clusters may include states optimized for the multi-set training speech data 210 having different acoustic-statistical characteristics.

Next, referring to FIG. 2B, the processor 120 learns a DNN structured parameter 230 by setting the multi-set training speech data 210 as an input node and the multi-set state cluster 220 as an output node.

In this case, the processor 120 may generate state-level alignment information regarding each of these sound-model state sets, and may set the multi-set training speech data 210 including the state-level alignment information as an input node.

According to an exemplary embodiment of the present invention, the processor 120 may generate the state-level alignment information from the HMM of FIG. 2A trained with data for training a corresponding set. Thus, very precise state-level alignment information may be obtained.

The processor 120 learns the DNN structured parameter 230 by setting training data and a label for each state obtained from the state-level alignment information as an input node, and setting states obtained from the multi-set state cluster 220 as an output node.

The DNN structured parameter 230 may be learned through a process which will be described below. First, the DNN structured parameter 230 is learned to satisfy a condition that requires a specific output node (a state), a correct answer of which is determined on the basis of the state-level alignment information to be 'on' and the other output nodes to be 'off' with respect to each of samples of the plurality of pieces of set training speech data 211. The processor 120 may generate the DNN structured parameter 230 which is optimally learned by iteratively performing the above process a predetermined number of times.

In this case, the processor 120 may set the plurality of pieces of set training speech data 211 included in the multi-set training speech data 210 as input nodes, and may set the sound-model state sets 221 and 223 included in the multi-set state cluster 220 and corresponding to the plurality of pieces of set training speech data 211 as output nodes.

For example, the processor 120 may perform learning by first setting an English speech data set for training a Korean native speaker as an input node, and setting an English sound-model state set of the Korean native speaker as an output node.

Then, the processor 120 may perform learning by setting a speech data set for training a speaker of a different native language as an input node, and setting an English sound-model state set of this speaker as an output node.

In this process, the processor 120 disconnects the output node from another state cluster which is not related to a set of input nodes, and teaches connection of the output node to a corresponding set state cluster, thereby more precisely performing learning.

Next, referring to FIG. 2C, the processor 120 may recognize the user's speech input via the user interface using the DNN structured parameter 230 finally obtained during the DNN learning process described above with reference to FIG. 2B and a DNN-HMM structured sound model having the multi-set state cluster 220 obtained through the operations described above with reference to FIG. 2A.

The processor 120 receives the user's speech and characteristic information thereof via the user interface. In this case, the characteristic information of the user's speech may be, for example, information regarding the user's native language, e.g., English, Korean, Chinese, or the like. The processor 120 may recognize the user's speech on the basis of the learned DNN structured parameter 230 by setting the sound-model state set 221 corresponding to the characteristic information of the user's speech as an output node.

That is, in the recognizing of the user's speech, since a speaker knows his/her native language, when a speech set of a specific native language is input by the user via the user interface, e.g., when a native-language selection button is input by the user, the processor 120 sets only the sound-model state set 221 included in the entire multi-set state cluster 220 as an output mode and thus is able to perform speech recognition.

A speech recognition method according to an exemplary embodiment of the present invention will be described with reference to FIGS. 3 and 4 below.

Figure 3:
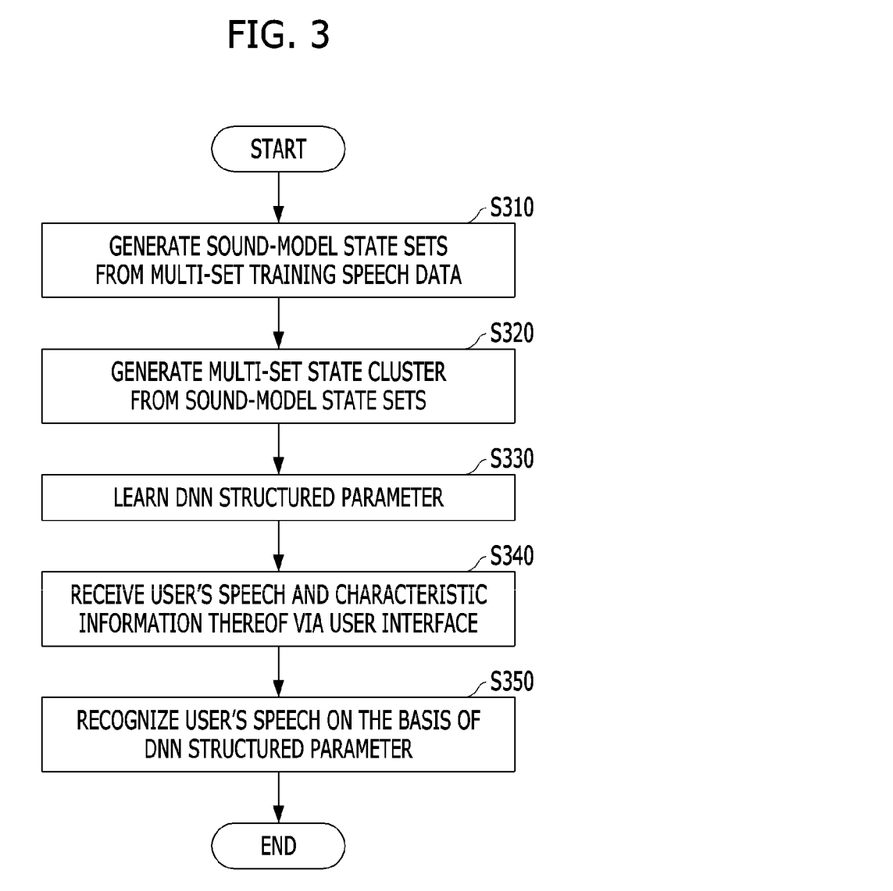
FIG. 3 is a flowchart of a speech recognition method according to an exemplary embodiment of the present invention.

FIG. 3 is a flowchart of a speech recognition method according to an exemplary embodiment of the present invention. FIG. 4 is a flowchart of a method of generating a multi-set state cluster.

In a speech recognition method according to an exemplary embodiment of the present invention, first, sound-model state sets corresponding to a plurality of pieces of set training speech data included in multi-set training speech data are generated (operation S310).

Next, a multi-set state cluster is generated from the sound-model state sets (operation S320). In this case, the multi-set state cluster may be generated according to operations of the method illustrated in FIG. 4.

Figure 4:
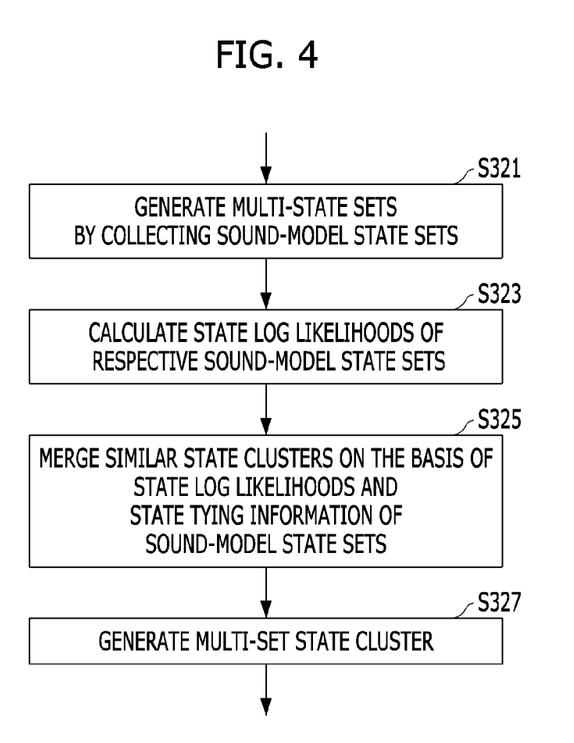
FIG. 4 is a flowchart of a method of generating a multi-set state cluster according to an exemplary embodiment of the present invention.

Referring to FIG. 4, in the generating of the multi-set state cluster (operation S320), first, multi-state sets are generated by collecting the sound-model state sets (operation S321). Then the multi-state set cluster is generated by clustering the multi-state sets as will be described below.

In detail, state log likelihoods of each of the sound-model state sets are calculated (operation S323), and similar state clusters are merged on the basis of the state log likelihoods and state tying information of the sound-model state sets (operation S325).

The merging of the similar state clusters may be performed as will be described below.

First, when states of two random sound-model state sets included in the multi-state sets are merged, state log likelihoods corresponding to the two random sound-model state sets may be calculated. The two random sound-model state sets may be merged when a difference between the sum of the state log likelihoods of the two random sound-model state sets and a state log likelihood corresponding to a result of merging the two random sound-model state sets is equal to or less than a predetermined threshold.

Alternatively, when logical tri-phone sets corresponding to the two random sound-model state sets included in the multi-state sets are the same, the two random sound-model state sets may be merged. In this case, even if the logical tri-phone sets are not exactly the same, the two random sound-model state sets may be merged when the logical tri-phone sets corresponding to the two random sound-model state sets included in the multi-state sets are mutually inclusive and no logical tri-phone set has a relation including another sound-model state set.

The multi-set state cluster may be generated by merging similar state clusters as described above (operation S327).

Referring back to FIG. 3, a DNN structured parameter is learned by setting the multi-set training speech data as an input node and the multi-set state cluster as an output node (operation S330). In detail, the DNN structured parameter may be learned by setting the plurality of pieces of set training speech data included in the multi-set training speech data including state-level alignment information generated with respect to each of the sound-model state sets as input nodes and by setting sound-model state sets included in the multi-set state cluster and corresponding to the plurality of pieces of set training speech data as output nodes.

Next, when a user's speech and characteristic information thereof are received via the user interface (operation S340), the user's speech is recognized on the basis of the DNN structured parameter by setting a sound-model state set corresponding to the characteristics information of the received speech as an output node (operation S350).

In the above description, according to an exemplary embodiment of the present invention, operations S310 to S350 may be divided into sub-operations or combined into a smaller number of operations. Alternatively, some of the operations S310 to S350 may be omitted if necessary, and the operations S310 to S350 may be performed in an order different from that described herein. Furthermore, although not described here, the description of the speech recognition apparatus 100 with reference to FIGS. 1 to 2C are applicable to the speech recognition method of FIGS. 3 and 4.

According to the exemplary embodiments of the present invention described above, a DNN structured parameter including different acoustic-statistical characteristics and a DNN-HMM structure including a multi-set state cluster may be provided, and training and speech recognition may be performed with a smaller number of state sets as output nodes with respect to input speech of a selected specific set. Accordingly, a more optimized DNN-HMM structure sound-model parameter may be learned and used for speech recognition.

In particular, according to an exemplary embodiment of the present invention, large-vocabulary speech recognition may be performed on input speech having different acoustic-statistical characteristics, e.g., speech of multiple native speakers.

A speech recognition method performed by the speech recognition apparatus 100 according to an exemplary embodiment of the present invention may be embodied as a computer program stored in a medium readable by a computer or a recording medium storing instructions which are executable by a computer. The medium readable by a computer may be an arbitrary medium accessible by a computer. Examples of the medium readable by a computer include a volatile/non-volatile medium, a separable/non-separable medium, and so on. Furthermore, examples of this medium may include a computer storage medium and a communication medium. The medium readable by a computer includes a volatile/nonvolatile/separable/non-separable medium embodied according to a method or technique of storing information, e.g., computer-readable instructions, data structures, program modules, or other data. The communication medium should be generally understood to include computer-readable instructions, data structures, program modules, other data, e.g., modulated data signals such as subcarriers, or other transfer mechanisms. An example of the communication medium includes an arbitrary information transfer medium.

Although methods and systems according to the present invention have been described above with respect to exemplary embodiments, some or all of elements or operations of the methods and systems may be realized by a computer system having a general-purpose hardware architecture.

The above description of the present invention is merely an example. It should be apparent to those of ordinary skill in the art that the present invention may be embodied in many different forms without changing the technical idea or essential features thereof. Thus, the above exemplary embodiments are merely examples and the present invention is not limited thereto. For example, elements of the exemplary embodiments described as being included in a single device may be dispersed. Similarly, elements of the exemplary embodiments described as being dispersed may be combined.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A speech recognition apparatus based on a deep-neural-network (DNN) sound model, comprising:
   a memory; and
   a processor configured to execute a program stored in the memory,
   wherein, as the program is executed, the processor:
      generates sound-model state sets corresponding to a plurality of pieces of set training speech data included in multi-set training speech data,
      generates a multi-set state cluster from the sound-model state sets, generating the multi-set state cluster comprising:
         collecting the sound model states;
         calculating respective state log likelihoods of the sound models states; and
         generating the multi-set state cluster by merging a first sound model state set with a second model state set using the state log likelihoods,
      learns a DNN structured parameter by setting the multi-set training speech data as an input node of the DNN, setting the multi-set state cluster as an output node of the DNN, and disconnecting the output node from a state cluster of the DNN not related to the input node, and
      when a user's speech and characteristic information thereof are received via a user interface, recognizes the user's speech on the basis of the learned DNN structured parameter by setting a sound-model state set corresponding to the characteristic information of the user's speech as an output node.

2. The speech recognition apparatus of claim 1, wherein the processor calculates a state log likelihood corresponding to a result of merging states of the first and second sound-model state sets included in the multi-state sets, and merges the first and second sound-model state sets when a difference between a sum of the state log likelihoods of the first and second sound-model state sets and the state log likelihood corresponding to the result of merging the first and second sound-model state sets is equal to or less than a predetermined threshold.

3. The speech recognition apparatus of claim 2, wherein each of the sound-model state sets configures an independent state space on the multi-set state cluster, and the result of merging the first and second sound-model state sets shares the independent state space.

4. The speech recognition apparatus of claim 1, wherein the processor merges the first and second sound-model state sets included in the multi-state sets when logical tri-phone sets corresponding to the first and second sound-model state sets are the same.

5. The speech recognition apparatus of claim 3, wherein each of the sound-model state sets configures an independent state space on the multi-set state cluster, and the result of merging the first and second sound-model state sets shares the independent state space.

6. The speech recognition apparatus of claim 1, wherein the processor merges the first and second sound-model state sets included in the multi-state sets when logical tri-phone sets of the sound-model state sets are mutually inclusive and no logical tri-phone set has a relation including another sound-model state set.

7. The speech recognition apparatus of claim 1, wherein the processor generates state-level alignment information regarding each of the sound-model state sets, and sets the multi-set training speech data including the state-level alignment information as an input node.

8. The speech recognition apparatus of claim 1, wherein the processor sets the plurality of pieces of set training speech data included in the multi-set training speech data as input nodes, and sets the sound-model state sets included in the multi-set state cluster and corresponding to the plurality of pieces of set training speech data as output nodes.

9. The speech recognition apparatus of claim 1, wherein the plurality of pieces of set training speech data comprise different acoustic-statistical characteristics.

10. The speech recognition apparatus of claim 9, wherein the different acoustic-statistical characteristics comprise acoustic-statistical characteristics corresponding to speakers of different native languages.

11. A speech recognition method based on a deep-neural-network (DNN) sound model, comprising:
   generating sound-model state sets corresponding to a plurality of pieces of set training speech data included in multi-set training speech data;
   generating a multi-set state cluster from the sound-model state sets, generating a multi-set state cluster including collecting the sound-model state sets, calculating state log likelihoods of each state of the sound-model state sets, and generating the multi-set state cluster by merging first and second sound-model state sets on the basis of the state log likelihoods and state tying information of the sound-model state sets;
   learning a DNN structured parameter by setting the multi-set training speech data as an input node, setting the multi-set state cluster as an output node, and disconnecting the output node from a state cluster of the DNN not related to the input node;
   receiving a user's speech and characteristic information thereof via a user interface; and
   recognizing the user's speech on the basis of the learned DNN structured parameter by setting a sound-model state set corresponding to the characteristic information of the user's speech as an output node.

12. The speech recognition method of claim 11, wherein the merging of the similar state clusters comprises:
   calculating a state log likelihood corresponding to a result of merging states of the first and second sound-model state sets included in the multi-state sets; and
   merging the first and second sound-model state sets when a difference between a sum of the state log likelihoods of the first and second sound-model state sets and the state log likelihood corresponding to the result of merging the first and second sound-model state sets is equal to or less than a predetermined threshold.

13. The speech recognition method of claim 11, wherein the merging of the similar state clusters comprises merging the first and second sound-model state sets included in the multi-state sets when logical tri-phone sets corresponding to the first and second sound-model state sets are the same.

14. The speech recognition method of claim 11, wherein the merging of the similar state clusters comprises merging first and second sound-model state sets included in the multi-state sets when logical tri-phone sets of the first and second sound-model state sets are mutually inclusive and no logical tri-phone set has a relation including another sound-model state set.

15. The speech recognition method of claim 11, further comprising generating state-level alignment information regarding each of the sound-model state sets, and
   wherein the learning of the DNN structured parameter comprises setting the multi-set training speech data including the state-level alignment information as an input node.

16. The speech recognition method of claim 11, wherein the learning of the DNN structured parameter comprises setting the plurality of pieces of set training speech data included in the multi-set training speech data as input nodes, and setting the sound-model state sets included in the multi-set state cluster and corresponding to the plurality of pieces of set training speech data as output nodes.

* * * * *